United States Patent
Fransson et al.

(10) Patent No.: US 7,089,308 B2
(45) Date of Patent: Aug. 8, 2006

(54) COMMUNICATION PROTOCOL

(75) Inventors: Bjorn Fransson, Bromma (SE); Ola Sandstrom, Lund (SE)

(73) Assignee: Anoto AB c/o Technologies AB, Lund (SE)

( * ) Notice: Subject to any disclaimer, the term of this patent is extended or adjusted under 35 U.S.C. 154(b) by 653 days.

(21) Appl. No.: 10/188,960

(22) Filed: Jul. 5, 2002

(65) Prior Publication Data

US 2003/0055865 A1 Mar. 20, 2003

Related U.S. Application Data

(60) Provisional application No. 60/303,814, filed on Jul. 10, 2001.

(30) Foreign Application Priority Data

Jul. 5, 2001 (SE) .................................. 0102418

(51) Int. Cl.
*G06F 15/16* (2006.01)
(52) U.S. Cl. .................................................... 709/225
(58) Field of Classification Search .............. 709/225, 709/203
See application file for complete search history.

(56) References Cited

U.S. PATENT DOCUMENTS

| | | | |
|---|---|---|---|
| 5,652,412 A | 7/1997 | Lazzouni et al. | |
| 5,696,898 A * | 12/1997 | Baker et al. | 713/201 |
| 6,182,086 B1 | 1/2001 | Lomet et al. | |
| 6,266,692 B1 * | 7/2001 | Greenstein | 709/206 |
| 6,366,907 B1 * | 4/2002 | Fanning et al. | 707/3 |
| 6,548,768 B1 * | 4/2003 | Pettersson et al. | 178/18.01 |
| 6,663,008 B1 * | 12/2003 | Pettersson et al. | 235/494 |
| 6,674,427 B1 * | 1/2004 | Pettersson et al. | 345/179 |
| 6,724,373 B1 * | 4/2004 | O'Neill, Jr. et al. | 345/179 |
| 6,868,498 B1 * | 3/2005 | Katsikas | 726/14 |
| 6,952,497 B1 * | 10/2005 | Hollström et al. | 382/188 |

FOREIGN PATENT DOCUMENTS

| | | |
|---|---|---|
| EP | 0737922 A1 | 10/1996 |
| KR | 2001029046 | 4/2001 |
| WO | WO 9944134 | 9/1999 |
| WO | WO 99/50751 | 10/1999 |
| WO | WO 99/50787 | 10/1999 |
| WO | WO 00/72244 A1 | 11/2000 |
| WO | WO 00/73983 | 12/2000 |
| WO | WO 0116691 A1 | 3/2001 |
| WO | WO 01/26032 A1 | 4/2001 |
| WO | WO 01/48591 A1 | 7/2001 |
| WO | WO 01/48592 A1 | 7/2001 |
| WO | WO 01/48678 A1 | 7/2001 |
| WO | WO 01/48685 A1 | 7/2001 |
| WO | WO 01/61450 A2 | 8/2001 |

* cited by examiner

*Primary Examiner*—David Y. Eng
(74) *Attorney, Agent, or Firm*—Birch, Stewart, Kolasch & Birch, LLP

(57) ABSTRACT

The present invention relates to managing of communication in a system, which system includes at least one user unit 100 capable of reading information from a surface 120 and communicating at least part thereof to a server 140, 150, 160, a look-up server 140, 150 storing information management rules associated with information read from the surface and at least one application server 160. The user unit 100 receives an instruction with control data from the look-up server 140, 150 and determines, based on these control data, if specific information data is allowed to be communicated by the user unit to a receiving application server in response to an instruction from an application server concerning these specific information data.

24 Claims, 5 Drawing Sheets

COMMUNICATION PROTOCOL

This application claims the benefit of Provisional application Ser. No. 60/303,814, filed Jul. 10, 2001.

TECHNICAL FIELD

The present invention relates to a method, a user unit and a computer readable medium storing instructions for managing communication in a system, which system includes at least one user unit capable of reading information from a surface and a plurality of servers arranged to communicate with the user unit.

BACKGROUND OF THE INVENTION

Information is often written down and communicated by means of pen and paper. Such paper-based information is, however, difficult to manage and communicate efficiently.

Computers are used, to an increasing extent, for managing and communicating information, The information is typically entered by means of a keyboard and stored in the computer's internal or external memory, for example on a hard disk. The entry of the information by means of the keyboard is, however, a relatively slow process and there is a significant risk of errors occurring in that process. Nor is it particularly convenient to read large amounts of text on a computer screen. Graphical information, such as drawings or images, is often entered by means of a separate image reader, such as a scanner or the like, in a procedure which is time-consuming, cumbersome, and which quite often gives unsatisfactory results. However, once the information is in the computer, it is easy to communicate it to others, for example as an e-mail or an SMS (Short Message Service) message via an Internet connection, or as a fax via a fax modem.

The present Applicant has proposed a remedy to this problem in the international application WO 01/16691, which is incorporated herein by reference, in which the Applicant envisages the use of a product having a writing surface which is provided with a position code. The position code, which codes a plurality of positions on the surface, enables electronic recording of information that is being written on the writing surface. The information is written by means of a digital pen having a sensor which detects the position code and calculates positions corresponding to the written information. The product also has one or more activation icons which, when detected by the digital pen, cause the pen to initiate a respective predetermined operation which utilizes the is information recorded by the pen.

More specifically, the position-coded product has a built-in functionality, in that different positions on the product, such as positions within the activation icon and positions within the writing surface, are dedicated for different functions. Furthermore, the position code is capable of coding co-ordinates of a large number of positions, much larger than the number of necessary positions on one single product. Thus, the position code can be seen as forming a virtual surface which is defined by all positions that the position code is capable of coding, different positions on the virtual surface being dedicated for different functions and/or actors.

The above concept can be used for a number of different purposes. The combination of pen and position coded product can be used as an input device to a computer, a PDA, a mobile phone or the like. For example, text and sketches written on a position-coded notepad can be transferred via the pen to a computer. Additionally, the combination of pen and position-coded product allows for global communication, directly from the product via the pen, by the position code on the product being dedicated for such communication. For example, the information registered by the pen can be transformed to a fax message, an e-mail or an SMS message, and then be sent from the pen to a recipient. Further, the combination of pen and position-coded product can be used in e-commerce. For example, the digital pen can be used to order an item from a position-coded advertisement in a magazine, by the position code in the advertisement being dedicated for such a service.

Typically, a system designed to include digital pens, or corresponding devices, will in addition to the pens and a plurality of position coded products include at least one look-up server running a service called a Paper Look-up Service PLS and a plurality of application servers acting as actors or Service Handlers SH in the system. The look-up server uses a database to manage the virtual surface defined by the position code and the information related to this virtual surface, i.e. the functionality of every position on the virtual surface and the actor associated with each such position. The application server is a server effecting a service on behalf of a digital pen, such as storing or relaying digital information, or initiating transmission of information or items to a recipient.

In such a system described above it is very difficult to foresee how a digital pen will communicate with the single, or multiple, look-up server(s) and the multiple application servers. The system provides a great number of possibilities for an actor wishing to design a service or application, e.g. which single or multiple further services or application servers that are to be involved in a specific service, the interaction between the digital pen and different services when using a specific service, what actions to be performed by the digital pen during utilization of a service etc. Also, an operator of a look-up server would benefit from being able to control communicated data and the communication itself between digital pens and different actors, especially during initiation of a service. Furthermore, there could be more than one look-up server in the system, with e.g. different responsibilities, such that a mechanism is needed to control with which look-up server a digital pen is to communicate.

Thus, one problem that needs to be solved is how to co-ordinate and control the communication in a system as described above in a simple and efficient way.

SUMMARY OF THE INVENTION

An object of the present invention is to provide a scheme for controlling the communication between a user unit, which is capable of reading information from a surface, and servers running services supporting the user unit.

Another object is to provide a communication protocol to be used by a user unit that enables a look-up server to control the communication in which the user unit is involved. In particular, an object is to enable for a look-up server to have exclusive control regarding what information, which information either is stored or read by the digital pen, that should be accessible to an application server communicating with the digital pen.

According to the invention, the problem is solved and the objects achieved by a method having the features as defined in independent claim 1, a user unit having the features as defined in independent claim 23 and a computer readable medium having the features as defined in independent claim 24.

The invention is applicable in a system which includes at least one user unit capable of reading information from a surface and communicating at least part thereof to a server, a look-up server storing information management rules associated with information read from the surface and at least one application server. According to the invention, a user unit receives one or more instructions with control data from the look-up server. The user unit is then able to determine, based on these control data, what specific information data that should be accessible to an application server, i.e., allowed to be communicated to an application server. Then, when receiving an instruction from an application server to respond with specific information data, the user unit determines, based on the control data, if these specific information data is allowed to be communicated. If this is the case, the specific information data is transmitted in a message to a receiving application server.

It will be understood that different application servers will provide services with different purposes. Depending on the type of service, the service may be cheap or expensive (for a user unit using the service or for an actor providing the service). For example, a cheap service could be a service which simply enables a user unit to order further information of some sort, whereas an expensive service could be a stock broking service.

Using the present invention a look-up server in the system will use its exclusive instructions to control what information that may be communicated from the user unit to an application server running a particular service. This also implies that the look-up server may guarantee what information stored or read by a user unit that can, and what information that can not, be accessed by an application server. The operator of the look-up server can have an agreement with an operator of a service implemented by an application server, in which agreement the operator of the look-up service guarantees certain particulars of the service. For example, for a stock broking service, it can be guaranteed that only the operator of this service will be provided with access to an account number which is associated with the service and stored by the user unit. On the other hand, for a cheaper service only to be used for ordering information, the application server implementing this information ordering service should only be able to access as little user unit information as possible, such as the name and street address properties stored by the user unit.

Furthermore, the invention may enable a look-up server to control the level of security of the communication in which the user unit is involved. By providing a higher security for some services, or some user unit subscriptions, such services or subscriptions can be provided at a higher price and increase the revenues of an operator.

The control data of a specific instruction from the look-up server may correspond either to one or more parameters defining one or more properties stored by the user unit, or, a parameter defining a page address, i.e. the address of a confined area of the surface from which the user unit is capable of reading information. In the first case, this implies that the user unit is allowed to communicate specific information data that correspond to a property parameter value stored by the user unit. In the latter case, it implies that the user unit is allowed to communicate specific information data that correspond to positions read by the user unit from a particular page.

The user unit is according to the invention responsive to a specific set of instructions that are for the exclusive use by the look-up server. These exclusive instructions have different purposes, in accordance with their definitions and use as will be described in the detailed description, and include instructions for controlling what information data, either stored or read by the user unit, that should be accessible to an application server.

Typically, the user unit may from an instruction to respond with specific information data extract an address identifying a specific receiving application server. This address is needed when the receiving application server of the specific information data is a different server than the application server from which the instruction to respond with that specific information data was received Advantageously, the user unit is arranged to extract result data from a subsequent instruction received from the receiving application server to which the user unit transmitted the message with the specific information data. These result data are stored by the user unit and later transmitted to the look-up server as an indication of the result of an activity performed by the application server. Thus, the communication is thereby controlled in such way that it enables tracking of the results of the activities in which a user unit is involved. In this way an operator in the system, e.g. the operator of the look-up server, will have a basis for administrating billing of the user unit subscriber and/or an actor, such as an operator of a service implemented by an application server, for the activities performed and, thus, the services used in the overall system.

A message with instructions received by the user unit and any message with information data transmitted from the user unit as a result thereof defines a user unit roundtrip. A communication session in which the user unit transmits data read from a surface involves one or more such roundtrips.

When initiating a communication session the user unit executes a set of pre-stored start-up instructions. These typically result in a message being transmitted to the look-up server which stores information management rules associated with different surface areas. The look-up server is furthermore responsible for the initial control of the communication behavior of the user unit. Advantageously, the user unit is able to associate new instructions with its start-up procedure in response to an instruction from the look-up server, which instruction is pre-defined to initiate such an action. Moreover, if the user unit has detected information of a specific surface area defining a send operation, the pre-stored instructions associated with this area are executed.

The person skilled in the art will realize that the user unit of the present invention may be any kind of handheld device which is capable of reading information from a surface and communicating at least part thereof over a communications network.

Further features of, and advantages with, the present invention will become apparent from the following description, which refers to the accompanying drawings, of exemplifying embodiments thereof.

BRIEF DESCRIPTION OF THE DRAWINGS

Exemplifying embodiments of the present invention will now be described in greater detail with reference to the accompanying drawings, in which.

DETAILED DESCRIPTION OF THE INVENTION

Figure 1:
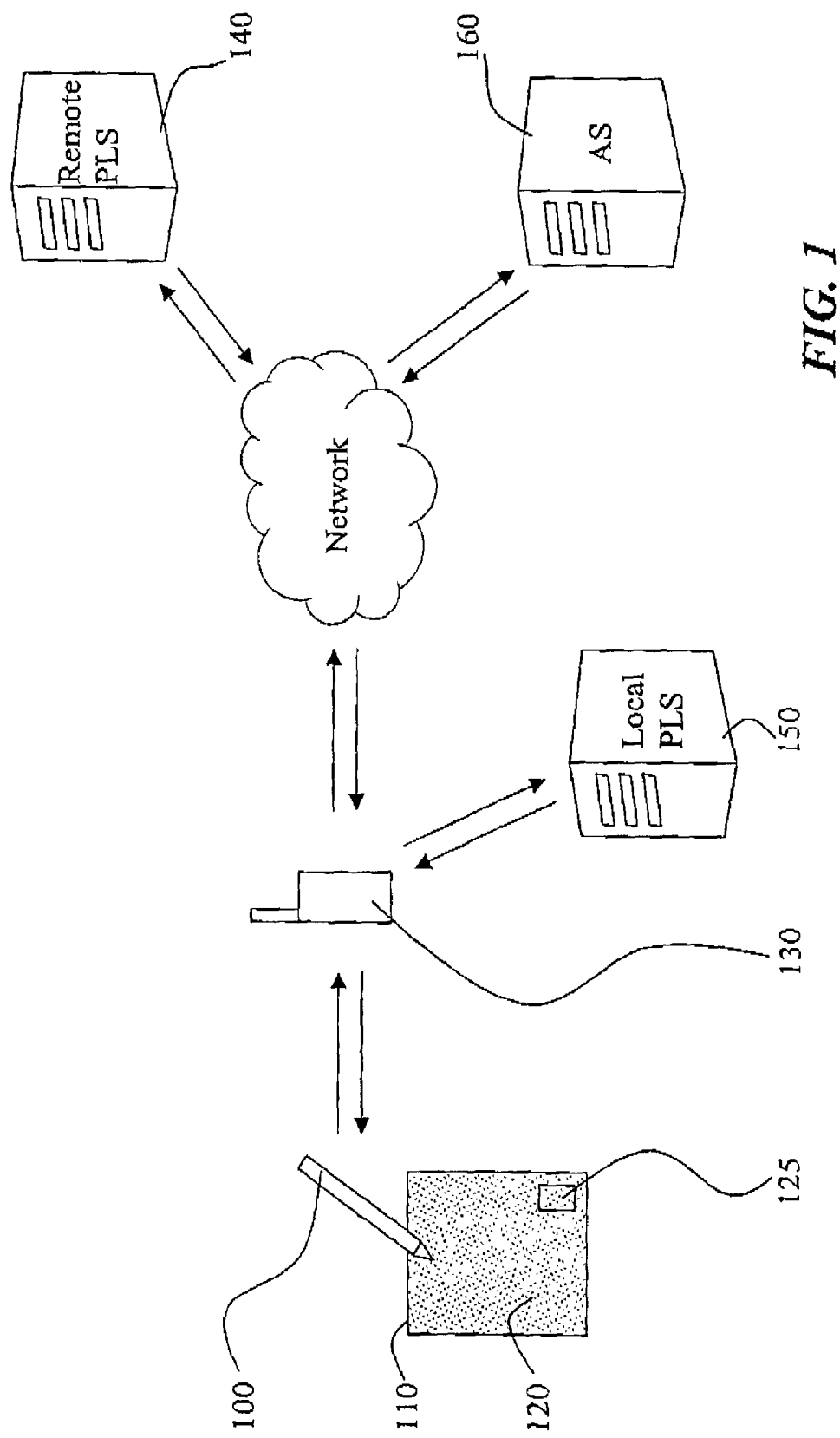
FIG. 1 shows the elements and their basic interaction in a system which includes user units and servers running supporting services.

The infrastructure of a system which includes user; units and supporting services are shown in FIG. 1. This infrastructure and parts of its operation have previously been described by the present Applicant's international patent applications PCT/SE00/02640, PCT/SE00/02641, and PCT/SE0002659, which all are incorporated herein by reference.

The system of FIG. 1 comprises a plurality of user units 100, a plurality of products 110 with position codes 120, a plurality of network connection units 130 and a plurality of servers 140, 150, 160 running supporting services. The servers include at least one remote look-up server 140, one local look-up server 150 and a plurality of application servers 160. For ease of description, FIG. 1 only includes one digital pen 100 embodying a user unit, one product 110 with a position code 120 and an activation icon 125, one mobile station 130 embodying a network connection unit, one remote look-up server 140 running a remote Paper Look-up Service (remote PLS), one local look-up server 150 running a local Paper Look-up Service (local PLS) and one application server 160 running an Application Service (AS).

The product 110 is provided with a coding pattern which is interpreted by the digital pen 100 as positions on the surface of the product 110. The coding pattern is such that it codes positions on a total surface which is much larger than the surface of the product 110. Based on detected positions, the digital pen determines one or more absolute co-ordinates of the surface.

The total surface is advantageously divided into a number of segments, each segment being divided into a number of shelves, each shelf being divided into a number of books, and each book being divided into a number of pages. An absolute co-ordinate will by the digital pen be determined to be located on a certain page. The page may be identified using the format 1.2.3.4 (segment.shelf.book.page), which denotes page 4 of book 3, on shelf 2, in segment 1. This notation defines a page address.

When the user moves the digital pen 100 across the surface of the product 110, information is recorded by detecting positions on the surface and determining the corresponding absolute co-ordinates. These absolute co-ordinates, or the page address to which the co-ordinates belong, are communicated via the mobile station 130 to either the local PLS server 150, the remote PLS server 140 or the application server 160. If the local PLS server 150 is equipped with a Bluetooth® transceiver, the digital pen 100 may communicate directly with the local PLS server 150. The remote PLS server stores in a memory or in a connected data base (not shown) particulars about all the co-ordinates of the total surface. This also includes storing particulars about the pages in which the total surface is divided. Similarly, the local PLS server 150 stores particulars about co-ordinates and pages of one or more confined surface areas, which surface areas are used by one or a limited number of users and which surface areas are parts of the total surface. The remote/local PLS server contains software which processes received information, which at least include co-ordinate content or page address content, in accordance with the management rules that have been associated with a particular co-ordinate or a particular page address.

For the user, the system is simple to use as the user does not himself need to define how recorded information is to be managed. When the user initiates a communication session for transmission of information, the management of this information is controlled based on the co-ordinates that the user records and/or the page address on which the information was recorded by means of the digital pen 100.

When the user of the digital pen 100 wishes to initiate transmission of information he "ticks" the activation icon 125. The recording of at least one position of the activation icon will in this case be recognized by the user unit 100 as a co-ordinate of a send area, which send area is associated with a particular send instruction. By default, this send instruction includes the address of a predefined PLS server, either the remote PLS server 140 or the local PLS 150. Alternatively, two send areas exist, one associated with the remote PLS server and one with the local PLS server.

The position-coding pattern of the total surface, in which the surface of the product 110 constitutes a minor part, can be constructed in various ways, but has the general characteristic that if any part of the pattern of a particular minimum size is recorded, then the position thereof in the overall position-coding pattern can be determined unambiguously. Moreover, the overall position-coding pattern is divided into pages as described above.

The position-coding pattern is advantageously of the type which is shown in the published International Patent Application WO 00/73983 filed on May 26, 2000, or in the International Patent Application WO 01/26032 filed on 2, Oct. 2000, both of which applications are assigned to the present Applicant. In these patterns each position is coded by a plurality of marks or symbols, and each symbol contributes to the coding of several positions. The position-coding pattern is constructed of a small number of types of symbols. An example is shown in WO 00/73983 where a larger dot represents a "one" and a smaller dot represents a "zero".

The currently most preferred pattern is shown in WO 01/26032, where four different displacements of a dot or mark in relation to a raster point code four different values. This pattern is constructed of small dots at a nominal spacing of 0.3 mm. Any part of the pattern which contains 6×6 such dots defines a pair of absolute co-ordinates. Each pair of absolute co-ordinates is thus defined by a 1.8 mm×1.8 mm subset of the position-coding pattern. By means of determination of the position of the 6×6 dots detected by the sensor in the user unit which is used to read off the pattern, an absolute position on the virtual surface can be calculated by inter-polation with a resolution of 0.03 mm.

This position-coding pattern is able to code a large number of absolute-positions. As each position is coded by 6×6 dots, each of which can have one of four values, $4^{36}$ positions can be coded, which with the above-mentioned nominal distance between the dots corresponds to a surface of 4.6 million $km^2$.

As mentioned, the total surface is preferably divided, in turn, into segments, shelves, books and pages of a book. The different non-overlapping segments are dedicated to different types of information management. The concept of pages-books-shelves-segments allowing that, e.g., a part of a whole book or a whole shelf etc. is dedicated to a particular party for a certain type of information management. For example, certain pages can be dedicated to electronic information gathering for a transport company, other pages to managing electronic picture postcards for a distribution company, yet other pages to distribution of product information to a buyer of a particular product, yet other pages can be dedicated to recording hand written information which is always to be forwarded to a predetermined server on the Internet and yet other pages can be dedicated to sending of graphical e-mail, SMS, tax or the like.

Applications services are applications where the information management is controlled via one or more pre-determined application servers in the system. As indicated above, a company or the like can be allocated one or more pages, or preferably whole shelves, of the total surface, after which the company has the sole right to the allocated part of the total surface. Application services can also be present on a local server, e.g. the same server as that which includes the local PLS, and different local applications can be allocated to different pages. In the remote PLS server 140, which manages all the pages of the total surface, it is noted which company has the right to what part of the total surface. The remote PLS server 140 will in response to information received from the digital pen 100, including at least one co-ordinate or a page address, determine to what party, e.g. company, the corresponding surface area is allocated and how the information is to be handled. Similarly, the local PLS server 150 will in response to received information including at least one co-ordinate or a page address determine to what local application, e.g. calendar, e-mail or fax application, the corresponding surface area is allocated and how the information is to be handled.

Figure 2:
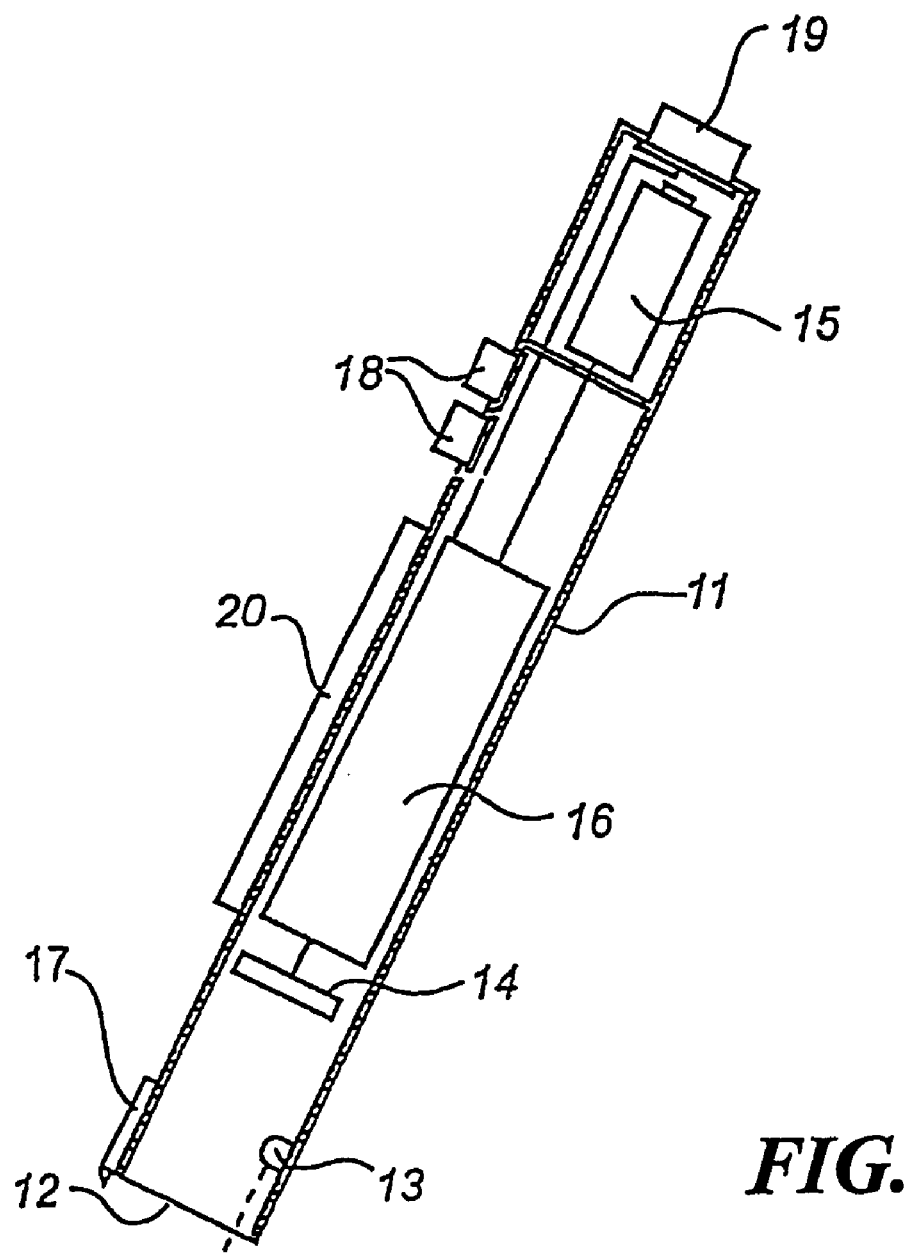
FIG. 2 is a schematic view of the interior of a digital pen embodying a user unit.

FIG. 2 shows an example of a user unit 100. The user unit comprises a casing 11 which has the approximate format of a pen. A short side of the casing has an opening 12 and is intended to be held in contact with or at a short distance from a base provided with a position-coding pattern.

The user unit, below called a digital pen, contains essentially an optics part, an electronic circuitry part and a power supply.

The optics part forms a digital camera and comprises at least one infrared light-emitting diode 13 for illuminating the surface which is to be imaged and a light-sensitive area sensor 14, for example a CCD or CMOS sensor, for recording a two-dimensional image. The user unit may also contain a lens system (not shown). The infrared light is absorbed by symbols, preferably dots, in the position-coding pattern and in this way makes them visible to the sensor 14. The sensor records advantageously at least 100 images per second.

The power supply for the pen is obtained from a battery 15 which is mounted in a separate compartment in the casing. Alternatively, however, the pen can be connected to an external power source.

The electronic circuitry part comprises a signal processor 16 for determining a position on the basis of the image read by the sensor 14 and more specifically a processor unit with a microprocessor which is programmed to record images from the sensor, identify symbols in the image and to determine in real time absolute co-ordinates for positions on the surface on the basis of the imaged subset of the position-coding pattern.

The digital pen comprises in this embodiment a pen point 17, with which the user can carry out ordinary pigment-based writing on the surface provided with the position coding pattern.

The digital pen can also comprise buttons 18 by which it is activated and controlled.

The position determination is thus carried out by the signal processor 16 which thus must have software to enable it to locate and decode the symbols in an image and to enable it to determine positions from the codes thus obtained. A person skilled in the art would be able to design such software from the description in the above-mentioned patent application WO 01/26032.

The signal processor 16 is also programmed to analyse stored pairs of co-ordinates and to convert these into a co-ordinate train which constitutes a description of how the user unit 100 has been moved across the surface which is provided with the position-coding pattern.

The signal processor 16 does not need to forward all the recorded information to the same server. The signal processor 16 can be programmed to analyse the recorded co-ordinates and only to forward information which is represented by co-ordinates within a particular co-ordinate area. The signal processor 16 can also have software for encrypting the information which is sent to a server.

The digital pen includes the definition of the position-coding pattern for the total surface which can be coded from this pattern. Thus, from a determined position the signal processor can derive what area of the total surface that the position belongs to. Typically, such an area represents a specific page or a specific activation icon on a page.

The digital pen is arranged to transmit information of a position coded surface, which is generated by the user with the digital pen, to a local or remote look-up service, or to an application service. In the system according to FIG. 1, the information is transmitted wirelessly to the mobile station 130 embodying the network connection unit, which in turn transmits the information to the local PLS server 150, the remote PLS server 140 or the application server 160. The network connection unit is alternatively a computer or some other suitable unit which has an interface to a network, for example the Internet, a local company network, or a telephone network. The network connection unit 130 can alternatively constitute an integrated part of the pen 100. All the recorded data can be stored in a buffer memory 20 awaiting transmission to the receiving server 140, 150, 160. As a result, the pen 100 can work in stand-alone mode, that is the pen 100 sends the information when it has the opportunity, for example when it makes contact with the network connection unit 130, whereupon it retrieves recorded information from the buffer memory 20.

Besides transmitting absolute co-ordinates of positions which are generated by analysing pen strokes on a surface, and page address data, the digital pen is also capable of transmitting pen property data to a server. The properties are stored in the memory 20 as addressable values or character strings which can be read and written by the processor 16. Below is an exemplifying, non-exhaustive, list of pen property data, further properties may easily be conceivable.

| | |
|---|---|
| PEN_ID | the pen's unique identity; |
| PEN_SOFTWARE_VERSION | the version of the pen's software; |
| TRANSACTION_DATA | identity and status of last transaction; |
| PEN_MANUFACTURER_ID | the identity of the pen manufacturer; |
| LOCAL_URL | the URL (Uniform Resource Locator) of a local server; |
| PLS_URL | the URL of a remote server running a paper look-up service; |
| LAST_PROPERTY_UPDATE | the identity of the last committed update of the properties in the pen; |
| PEN_OWNER_NAME | self-explanatory; |
| PEN_OWNER_ADDRESS | self-explanatory; |
| PEN_OWNER_INVOICE_ADDRESS | self-explanatory; |
| PEN_OWNER_EMAIL | self-explanatory; |
| PEN_OWNER_HOME_PHONE | self-explanatory; |
| PEN_OWNER_CELL_PHONE | self-explanatory; |
| PEN_OWNER_BUSINESS_PHONE | self-explanatory; |

-continued

| | |
|---|---|
| PEN_OWNER_PAGER | self-explanatory; |
| PEN_OWNER_HOME_FAX | self-explanatory; |
| PEN_OWNER_BUSINESS_FAX | self-explanatory; |
| TXT_SYSTEM_ERROR | A character string with a specific message, in this case error during a send request, A number of character strings with messages to the user exist. |

A user unit and its associated network connection unit are normally located fairly close to each other. The communication between the user unit and the network connection unit, such as between the digital pen 100 and the mobile station 130 in FIG. 1, can be carried out via wire, infrared radiation or radio waves, for example in accordance with the Bluetooth® technology, or some other technology for the transfer of information across short distances. For this purpose the digital pen in FIG. 2 has a transceiver 19 for wireless communication with external units, preferably a Bluetooth® transceiver.

Figure 3:
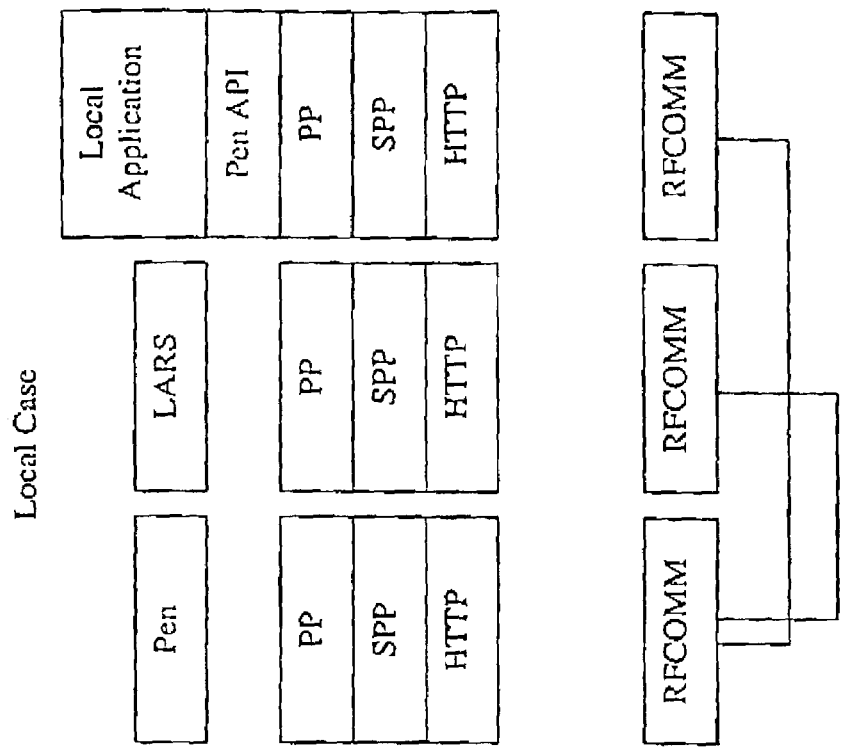
FIG. 3 shows the protocol stacks used when a user unit communicates with a remote network server or a local server.
Figure 3:
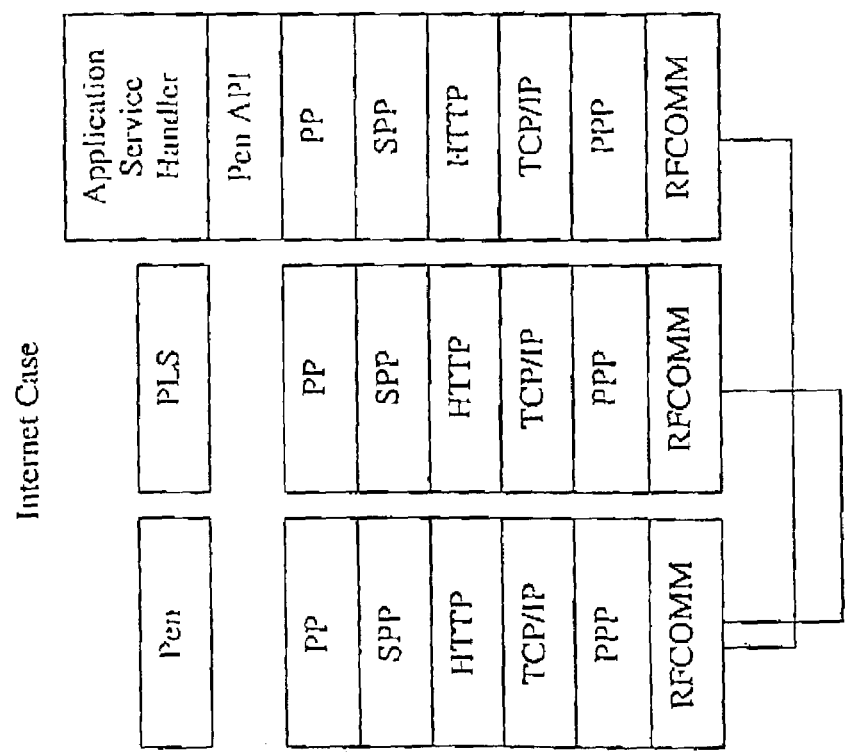

In FIG. 3 exemplifying protocol stacks used for communication between a user unit 100, such as a digital pen, and supporting services on different servers are shown. At the left hand side exemplifying protocol stacks are shown for communication over the Internet between a digital pen (PEN) and a paper look-up service (PLS), or between a pen and an application service (Application Service Handler) providing a service. At the right hand side exemplifying stacks are shown for communication between a digital pen and a local server. The local server is for example a local personal computer running a Local Application Router Service LARS (operating as a local PBS). In addition the local server may run a local application service.

The communication between the digital pen and any local or remote server is based on a set of predefined instructions which together define a Pen Protocol, PP. The PP is implemented on a Security Pen Protocol SPP, which in turn is implemented on the well known HTTP protocol. In the Internet case the HTTP layer is implemented on TCP/IP, PPP and the RFCOMM profile of Bluetooth®, and in the local case directly on the RFCOMM profile of Bluetooth®. Thus, the pen protocol PP is the protocol implementing the communication scheme being subject to the present invention. The Security Pen Protocol SPP is a proprietary protocol of the applicant of the present invention and the pen API (Application Programmers Interface) adds an abstraction layer upon PP to be used by actors when designing services supporting digital pens. Neither the SPP or the pen API are within the scope of the invention and will not be described any further. The other parts of the stacks are communication protocol layers which are well known to a person skilled in the art.

Instructions are received by the digital pen in an HTTP response transmitted from a server in response to an HTTP request previously transmitted by the pen.

A received message in an HTTP response consists of three parts: a protocol version data part describing what version of the pen protocol the rest of the response complies to, a response header part holding meta data about the response, and an instruction data part containing a number of instructions with parameters. The instruction data part identifies the instructions by means of their pre-defined identities. Each instruction identity is accompanied by one or more parameters identified by their respective parameter identity. Each parameter identity is accompanied by the parameter's value, which value can be a boolean value, an integer, a character string, a stream of bytes, or an array of values of any of the previous mentioned types.

Any user unit message transmitted from the digital pen is transmitted in an HTTP request. The user unit message is transmitted to a specific server and consists of four parts: a protocol version data part describing what version of the pen protocol the rest of the request complies to, a request header part holding meta data about the request, a page data part with recorded pen stroke data, and a property data part with one or more pen properties The property data part identifies the properties by means of their pre-defined identities. Each property identity is accompanied by the property's value, which value can be any of the types described above for the parameter value in a response. The request header part includes a page address and a pidget (paper widget) identity. The page address is the page identity of the page on which a send area, or any other activation icon, which initiated the request is located. Fixed bit positions of the page address represent, in turn, a segment, a shelf, a book and a page. As previously described, a page address can be denoted 'segment.shelf.book.page'. The pidget identity is the identity of the send area (or activation icon) on the page in question. Such an identity being necessary since more than one activation icon may be located on the same page. Any request from the digital pen during the same send session, i.e. during the same transaction, initiated by a certain send area on a certain page will include the page address of the page and the pidget of the send area.

The definition of each instruction which is included in the pen protocol is stored in the memory 20 of the digital pen 100. When the digital pen is to perform the action(s) associated with a specific instruction, the processor 16 will address the corresponding definition in the memory 20, which definition will control the operation of the processor 16 and, thus, the digital pen 100. The operation of the digital pen in general, and the operations in accordance with pen protocol instructions in particular, are controlled by computer-executable components stored by the memory 20. Hence, memory 20 embodies a computer-readable medium storing components for causing a digital pen 100 to operate in accordance with the present invention. However, such a computer-readable medium could also be external to the digital pen, either for the purpose of being accessed by the digital pen, or for the purpose of being transferred and downloaded in the memory 20 of the pen 100 at a later stage.

Below is a non-exhaustive list of instructions included by the pen protocol PP. The list is divided into remote PLS server exclusive instructions and public instructions. The latter meaning that any server, remote or local PLS server as well as any application server, may control the actions of a digital pen by means of these instructions.

Remote PLS Server Exclusive Instructions:
grantPageDataAccess (pageAddress)
  The parameter pageaddress defines the page(s) that can be accessed in a addPageData instruction in the same session.
grantPropertyAccess (property identities)
  One or more property identity parameters defines what pen properties that can be accessed in a addPropertyData instruction in the same session.
internetInitialApplicationRequest (url)
  Posts a request to the supplied url. The instruction implies that the underlying SPP protocol is used. This instruction may also include a parameter defining the minimum version, and a parameter defining the maximum version, of the SPP Protocol to be used. Furthermore, the instruction may include two parameters defining the minimum and the maximum versions of the Pen Protocol to be used.

internetLookupRequest

Posts a request to the url defined by the PLS_URL property. The instruction implies that the underlying SPP protocol is used.

regVerticalApp (pageAddress, instructionscript)

Associates a page or pages defined by parameter pageaddress with a set of instructions defined by the instructionscript parameter. These instructions will then be executed when detecting positions of the specific surface area, such as a send area.

setProperty (propertyID, value)

Assigns a certain property a specific value. The value can be a boolean value, an integer, a character string, a stream of bytes, or an array of values of any of the previous mentioned types.

startTransaction (transID)

This instruction starts an application transaction. The parameter identifies the transaction and is preferably equal to current GMT (Greenwich Mean Time) in milliseconds since year 1970, as counted by the remote, PLS server.

localLookupRequest

Posts a request to the url defined by the LOCAL_URL property.

Public Instructions:

abortTransactionVerbose

Aborts an application transaction.

addPageData (pageAddress)

The parameter pageAddress specifies the page from which recorded data is to be added to a user unit message in a request. This instruction requires that the server transmitting the instruction has the right to read the corresponding page data. This implies that the server is the remote PLS server, or that a grantPageDataAccess instruction has been called by the remote PLS server earlier in the session, or that the session is a local session and readable by the local PLS server.

addPropertyData (property identities)

One or more parameters that identify one or more pen properties. The values of these properties will be included in (added to) a user unit message of a request. This instruction requires that the server transmitting the instruction has the right to read the corresponding properties. This implies that the server is the remote PLS server or that a grantPropertyAccess instruction has been called by the remote PLS server earlier in the same session.

commitTransactionVerbose

Commits a transaction, i.e. tells the pen that the service has been performed successfully by the server.

internetApplicationRequest (url)

Posts a request to the supplied url. The instruction implies that the underlying SPP protocol is used.

localApplicationRequest (url)

Posts a request to the supplied url.

Figure 4:
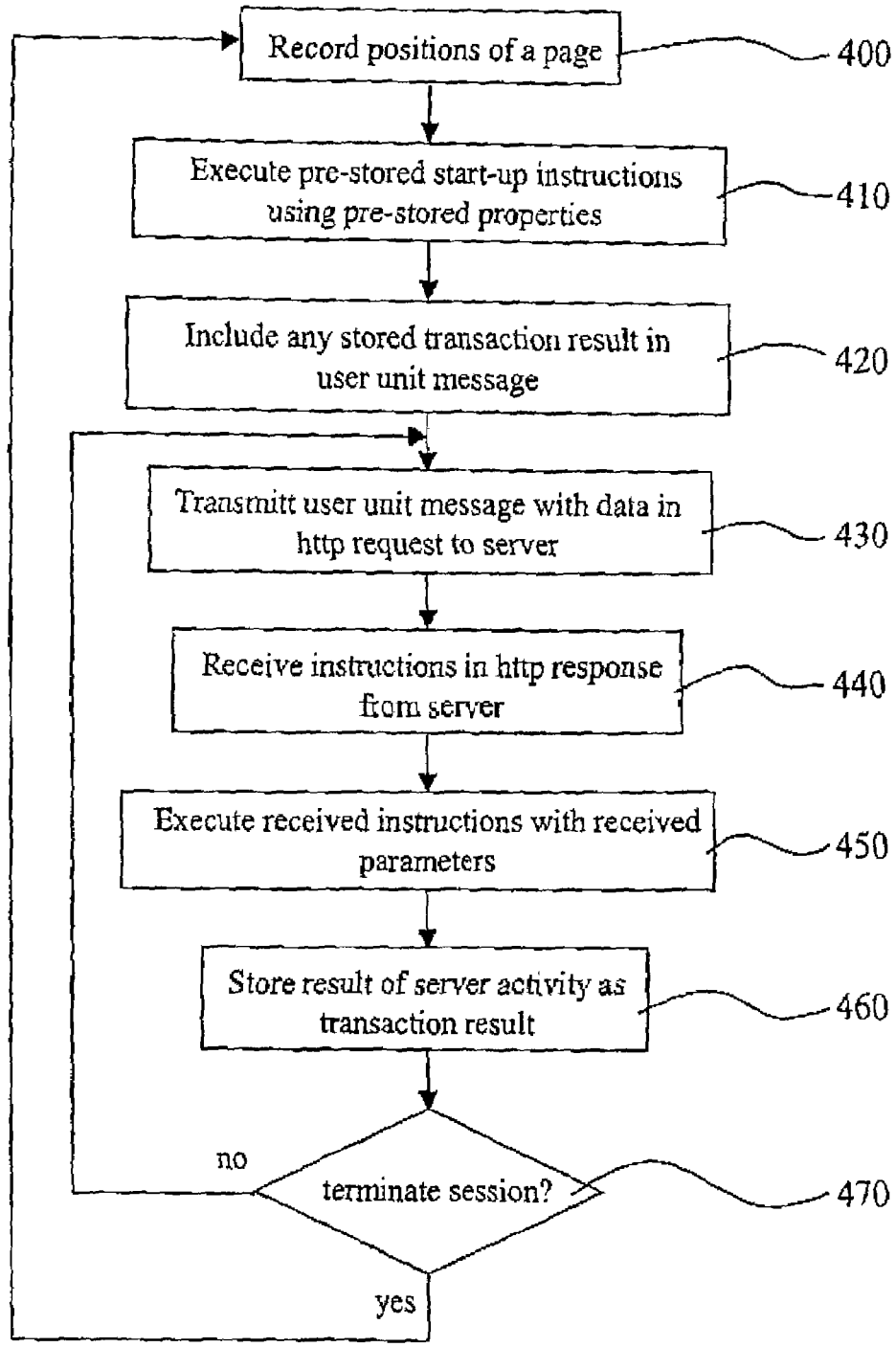
FIG. 4 shows a flow chart of the operation of a user unit in accordance with an exemplifying embodiment.

With reference to FIG. 4 a flow chart of the operation of a user unit in accordance with an exemplifying embodiment is shown. Note that the instructions and the parameters described below are mere examples. Many of these can be altered or replaced with other suitable instructions and/or parameters described herein and still fall within the embodiment of FIG. 4.

In step 400 the digital pen 100 records those parts of the position-coded pattern which are within the field of view of the area sensor 14 during pen strokes made with the digital pen by the user on a surface 120 having such a pattern. The processor 16 converts the detected positions on the surface with the position-coding pattern into absolute co-ordinates and generates a sequence of co-ordinates describing how the digital pen was moved over the surface during the pen strokes. This sequence of co-ordinates is also known as pen stroke data. Based on these cc-ordinates and knowledge of how co-ordinates define the total surface of the position coded pattern, the processor determines the corresponding page address of the specific surface to which the co-ordinates belong. If any co-ordinates belong to an activation icon 125, such as a send area, the corresponding send area identity, i.e. pidget identity, is determined based on knowledge of what co-ordinates define what activation boxes.

In step 410, the processor 16 of the digital pen 100 executes a set of pre-stored start-up instructions with a number of pre-stored parameters defining what data to transmit to what server. For example, if the processor detects that some recorded co-ordinates belong to an activation icon 125 defining an Internet send area, the pre-stored start-up instructions that are associated with this send area are executed. For example, the start-up instructions could be:

addPropertyData(PEN_ID, TRANSACTION_DATA, PEN_MANUFACTURER_ID, LAST_PROPERTY_UPDATE);

internetLookupRequest (PLS_URL).

The first instruction defines what property data that are to be transmitted. The second instruction will instruct the digital pen to transmit an RTTP request with a user unit message that includes the specified property data to the remote PLS server 140. The receiving server is identified by a predefined URL address stored by the property PLS_URL.

Alternatively, if the detected co-ordinates belong to an activation icon 125 defining a local send area, the user unit message is to be transmitted to the local PBS server 150 and the pre-stored start-up instructions could look like:

addPropertyData (PEN_ID);

localLookupRequest (LOCAL_URL).

Preferably, and as indicated above, the start-up instruction defining what property data to transmit to the remote PTS server includes the property TRANSACTION_DATA. This property includes the identity of the last transaction as well as the status of the last transaction. This status indicates the result (e.g. succeeded, aborted, pending) of an activity of an application server involved in the last transaction. Advantageously, the receiving remote PLS server can base billing on the received transaction data, e.g. by billing the pen subscriber if the transaction succeeded, but not if the status indicates that the transaction, for some reason, was aborted. This action of including the result of the last transaction in the message to be transmitted is indicated as step 420 in FIG. 4. Another property which preferably is transmitted by means of the start-up instructions is the LAST_PROPERTY_UPDATE. This property can be used by the receiving remote PLS server 140 to determine if it holds any updated information that should be stored by the pen as an updated pen property value. If so, the server 140 will at a later stage initiate the storing of new values for one or more properties using the instruction setProperty, as will be discussed below.

The transmission of the HTTP request with the user unit message to the server is indicated as step 430. As previously described, any user unit message will include the page address of the surface area on which pen strokes were detected and, if any activation icon was "ticked" by a pen stroke, the identity of this activation icon (pidget identity). By performing the transmission of the HTTP request, the digital pen initiates a send session. Thus, the send session can be initiated by the pen sending the HTTP request to either a remote or a local PLS server using the internetLookupRequest instruction or the localLookupRequest instruction, respectively. When sending the HTTP request by means of the internetLookupRequest instruction, this will imply that the Pen Protocol PP will use the underlying Security Pen Protocol SPP. The SPP provides encryption of the communication between the digital pen and the remote PLS server. Because of this encryption it is possible for the remote PLS server to transmit instruction of a pre-defined confined set of instructions to the digital pen, i.e. the remote PLS server exclusive instructions, and for the digital pen to be certain that any instruction of this confined set were received from the specific remote PLS server, rather than from any other server. This encryption can employ techniques which are well known to a person skilled in the art of cryptology. In any case, the implementation of the SPP protocol is out of the scope of the present invention.

Any instruction received by the digital pen 100 are received in step 440 in a HTTP response from the server to which the pen made an HTTP request. A variety of instructions may be received in the HTTP response. The response will typically include instructions of the discussed confined instruction set. Typical examples of such instructions include an instruction for updating a property stored in the pen, an instruction for associating a set of start-up instructions with a send area, or a number of instructions initiating a certain application transaction.

With the instruction setProperty (propertyID, value) the remote PLS server updates one or more properties stored by the pen. For example, it the pen in its request transmitted the property LAST_PROPERTY_UPDATE having a value of 2, the receiving server will check this value against a corresponding property update value stored by the server. If there is any difference between the values, the server is able to identify what property that needs to be updated. For example, when the pen receives the instruction setProperty (PEN_OWNER_EMAIL, mr_X@company_Y.com) in the HTTP response, this means that the pen will store its owner's new e-mail address. This activity is performed in step 450. If there were no more instructions received, the pen will terminate the session in step 470, after which the execution returns to step 400 for processing of new recorded positions from the surface.

With the instruction RegVerticalApp (pageAddress, instructionscript) a new set of start-up instructions is associated with a send area. For example, the instruction could relate to all pages on a certain segment/shelf/book. This is indicated with the page address, e.g. 2.3.4.* means all pages of book 4, shelf 3, segment 2. The instruction script includes co-ordinate parameters and defines which instructions to execute when the pen detects recording of positions of a send area defined by these co-ordinates on all pages defined by page address 2.3.4.*. It should be noted that new instructions can be associated with any activation box on any page in a similar manner. The pen stores the new instructions in step 450. If there were no more instructions received, the pen will terminate the session in step 470, after which the execution returns to step 400 for processing of new recorded positions from the surface.

Another typical example of instructions that are received from the remote PLS server in step 440 are the instructions that initiates an application transaction and which typically involves further transmission of pen stroke data from the digital pen. The instructions are transmitted by the remote PLS server in accordance with its stored management rules that are associated with the page address received with the HTTP request from the pen. An example of the instructions received when an application transaction is initiated are (any parameters excluded):
startTransaction;
addPropertyData;
addPageData; and
internetInitialApplicationRequest.

Again, the execution in accordance with the definitions of these instructions is performed in step 450.

The startTransaction (transID) instruction starts the new transaction. The parameter transID identifies the started transaction and is stored by the pen as part of a TRANSACTION_DATA property for this transaction. Advantageously, the transaction identity is a time stamp, for example current GMT (Greenwich Mean Time) in milliseconds since year 1970. Advantageously, the pen can use the transaction identity to synchronize its internal clock with the clock of the remote PLS server that sent the instruction.

The addPropertyData (PEN_ID, PEN_OWNER_EMAIL) instruction implies that the identified pen properties are included by the pen in the next user unit message to be transmitted. Since the instruction in this example is called by the remote PLS server, it does not have to be preceded by a grantPropertyAccess instruction.

The addPageData (pageAddress) instruction implies that pen stroke data of the identified page is included by the pen in the next user unit message to be transmitted. The instruction is here called by the remote PLS server and does not have to be preceded by a grantPageDataAccess instruction.

The internetInitialApplicationRequest (url) instruction implies that the pen transmits the user unit message in a HTTP request to the application server identified by the specific url and which application server is involved in the current transaction.

The execution of the above instructions up to transmission of the HTTP request from the pen is performed in step 450, after which the pen execution returns to step 430 in which the user unit message, in response to the internetInitialApplicationRequest instruction, is transmitted to the identified server.

For example, if a user of digital pen has made some pen strokes on an advertisement printed on a surface having a position-coding pattern and then initiates a send session by "ticking" a send area of the advertisement, the start-up instructions described above will result in an HTTP request to the remote PLS server which includes the page address of the surface on which the advertisement was printed and the identity of the send area "ticked". In accordance with the management rules associated with the page, the HTTP response from the remote PLS server includes instructions for controlling the pen to transmit an HTTP request to the actor associated with the page, typically a service run by the advertiser on an application server. In this example, as a result of the above received instructions, the pen will transmit its pen identity, its owners e-mail address and the pen stroke data made on the advertisement to the advertiser. This could e.g. result in an order of a product or ordering additional information of a product etc.

The activities performed by the service of the application server as a consequence of the HTTP request transmitted from the pen to the application server in step 430 can either be successful or, for some reason, malfunction. If the activity was successful, this is communicated back to the pen in step 440 with a commitTransactionVerbose instruction. The pen will then in step 460 store an indication of the successful transaction in the TRANSACTION_DATA property associated with this transaction. After that the pen terminates the session in step 470 and execution returns to step 400. The next time the user for some reason initiates a send session, the TRANSACTION_DATA property of this last transaction will be included in the HTTP request to the remote PLS server.

Figure 5:
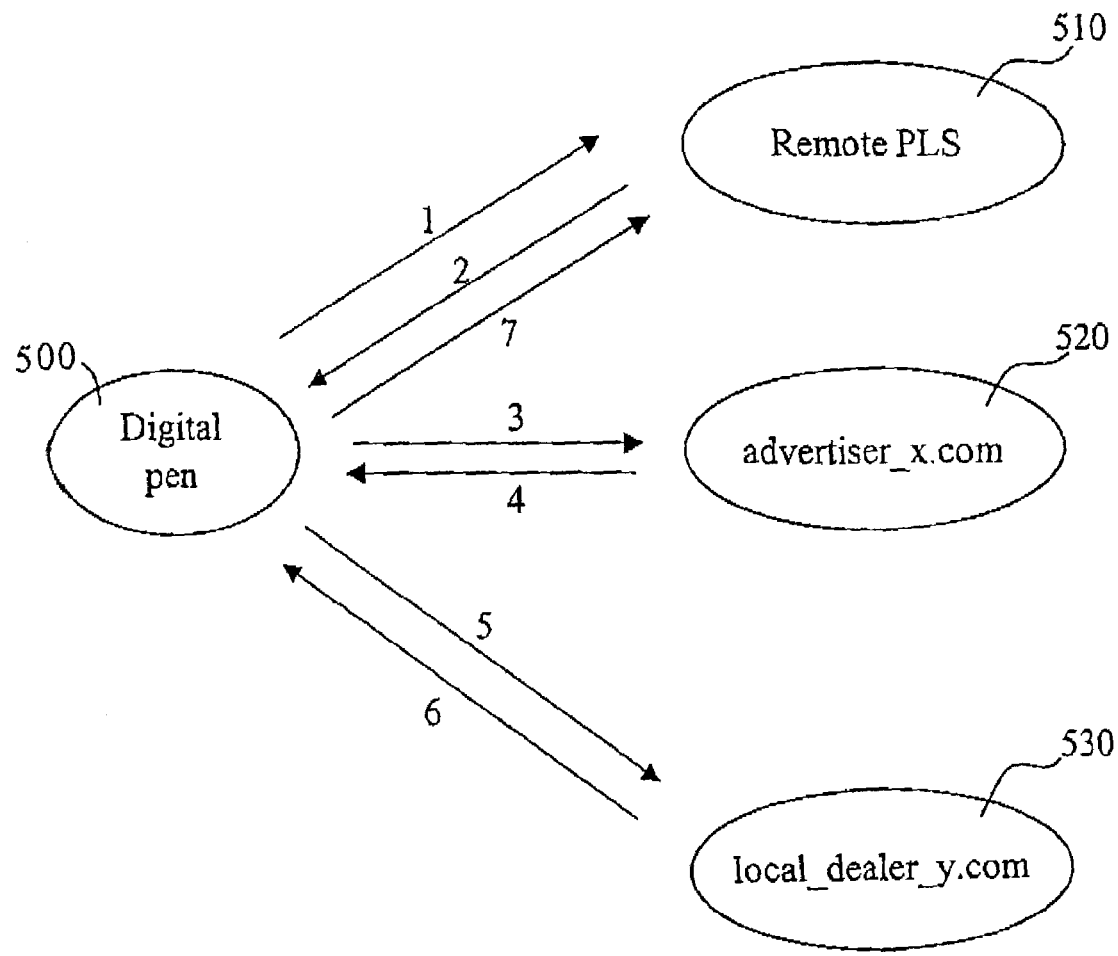
FIG. 5 shows a diagram illustrating the operation of a user unit and its communication with supporting services during a communication session in accordance with another embodiment of the invention.

In order to further illustrate an exemplifying embodiment of the invention, reference is made to FIG. 5. FIG. 5 shows a digital pen 500, a remote PLS server 510, an application server 520 and another application server 530. An actor, advertiser "X" runs an application service on application server 520 which has the URL "advertiser_x.com" and another application service is run by a local dealer "Y" on server 530 with the URL "local_dealer_y.com".

Recalling the example described in connection with FIG. 4, the user made some pen strokes on an advertisement and "ticked" a send area on the same. Step 1 of FIG. 5 shows the HTTP request which then is sent to the remote PLS server 510 and which includes the page address of the surface on which the advertisement was printed and the identity of the send area "ticked". Step 2 shows the HTTP response transmitted from the remote PLS server 510 back to the pen 500 with instructions in accordance with the management rules associated with the page in question. In this case the instructions are:

startTransaction (transID);
grantPageDataAccess (1.2.3.4);
grantPropertyAccess (PEN_ID, PEN_OWNER_NAME, PEN_OWNER_INVOICE_ADDRESS);
addPropertyData (PEN_ID, PEN_OWNER_ADDRESS); and
internetInitialApplicationRequest (advertiser_x.com).

One difference from the example of FIG. 4 is the transmission of a grantPageDataAccess instead of the addPageData instruction. The grantPageDataAccess instruction will define with a page address parameter that page 1.2.3.4 (being the page of the surface on which the advertisement is printed) can be accessed by any addPageData instruction later in the same session, and, thus, during the application transaction. In the same way the grantPropertyAccess instruction will define what properties that can be accessed by a server during the application transaction. The instruction will result in an HTTP request, step 3, from the pen 500 to application server 520 using the URL advertiser_x.com and with the properties PEN_ID and PEN_OWNER_ADDRESS in the user unit message.

Assume now that this receiving service is a central service run by the advertiser and that the advertiser wants to direct any user to a local dealer. By, e.g. examining the pen owner's address, the service determines the pen owner's nearest local dealer for the advertised product. The service of advertiser_x.com will in step 4 transmit an HTTP response back to the pen 500 with the instructions:

addPageData (1.2.3.4);
addPropertyData (PEN_ID, PEN_OWNER_NAME, PEN_OWNER_INVOICE_ADDRESS); and
internetApplicationRequest (local_dealer_y.com).

These instructions results in a HTTP request, step 5, from the pen 500 to the service run by local_dealer_y.com. The request includes a user unit message with the pen stroke data from page 1.2.3.4 and the property data PEN_ID, PEN_OWNER_NAME, PEN_OWNER_INVOICE_ADDRESS. If the order of the product can be served, the local dealer's service in step 6 responds to the request with an HTTP response from application server 530 to the pen 500 that includes a commitTransactionVerbose instruction including a parameter set to committed. As previously described this information indicating that the service was performed successfully will be transmitted from the pen 500 to the remote PLS server 510 during the next send session initiated by the pen, indicated as step 7. Based on this information the operator of the remote PLS server 510 may bill the user subscription for using the service provided by the operator.

This example illustrates that one and the same session may consist of more than one roundtrip, wherein one single roundtrip consists of an HTTP request transmitted by the pen to a server and a following HTTP response received by the pen from the same server.

It is to be understood that many different alterations, modifications and the like are possible with respect to existing pen properties, existing instructions and their associated parameters and with respect to the exact sequencing of the instructions.

Thus, even though the invention has been described with reference to specific exemplifying embodiments thereof, these embodiments are not intended to limit the scope of the invention, as defined by the appended claims.

The invention claimed is:

1. A method of managing communication in a system, the system including at least one user unit, which user unit is capable of reading information from a surface and communicating at least part thereof to a server, a look-up server which stores information management rules associated with information read from the surface, and at least one application server, the method comprising:

receiving, at the user unit from the look-up server, at least one instruction with control data which control what information that is allowed to be communicated by the user unit; and determining, at the user unit and based on the instruction from the look-up server, when receiving an instruction from an application server to respond with specific information data, if the specific information data is allowed to be communicated, and, if so, transmitting the specific information data in a user unit message to a receiving application server.

2. The method as claimed in claim 1, wherein the look-up server is a remote network server or a local server running a look-up service which stores information management rules associated with information read from the surface, and wherein the application server is any server running an application arranged to perform a service activity in response to a user unit message from a user unit.

3. The method as claimed in claim 1 or 2, wherein the user unit, when receiving the instruction with control data, performs the actions associated with the instruction in accordance with a definition provided by an instruction set stored by the user unit.

4. The method as claimed in claim 1, wherein the determining includes extracting an address from the instruction received from the application server, which address identifies the receiving application server of the user unit message.

5. The method as claimed in claim 1, wherein the received instruction with control data is determined by the user unit to be included in a specific set of instructions exclusively for use by the look-up server.

6. The method as claimed in claim 1, wherein the control data correspond to one or more parameters defining one or more properties stored by the user unit.

7. The method as claimed in claim 1, wherein said specific information data includes at least one property parameter value stored by the user unit.

8. The method as claimed in claim 1, wherein the control data correspond to a parameter defining a page address.

9. The method as claimed in claim 1, wherein said specific information data includes coordinates of positions read by the user unit from a surface.

10. The method as claimed in claim 1, wherein the receiving an instruction with control data from the look-up server is preceded by a step of transmitting a user unit message from the user unit to the look-up server in connection with execution, by the user unit, of a set of pre-stored start-up instructions.

11. The method as claimed in claim 1, wherein the user unit further performs:
   receiving from the application server to which, the user unit message was transmitted, an instruction with result data;
   extracting the result data from the instruction received from the application server;
   storing the result data as an indication of a result of an activity performed by the application server; and
   transmitting said result in a following user unit message to the look-up server in connection with execution, by the user unit, of a set of pre-stored start-up instructions.

12. The method as claimed in claim 10 or 11, wherein the transmission of a user unit message to a server followed by reception of at least one instruction from the same server define a user unit roundtrip, wherein a session initiated by the user unit for sending data from the user unit includes either one roundtrip or a number of subsequent roundtrips.

13. The method as claimed in claim 10, wherein the pre-stored start-up instructions include an address parameter identifying the look-up server and a set user unit property parameters defining what user unit properties that are to be included in the user unit message transmitted to the look-up server in connection with execution of the pre-stored start-up instructions.

14. The method as claimed in claim 10, wherein the user unit, following the execution of the pre-stored start-up instructions, is arranged to:
   receive a further instruction, from the look-up server, with a property parameter identifying a start of a specific session by means of an identifier; and
   store the identifier in the form of a time stamp.

15. The method as claimed in claim 14, wherein the user unit synchronises its internal clock with respect to said identifier.

16. The method as claimed in claim 13, wherein the set of user unit property parameters includes a last performed property update parameter, wherein the user unit, following the execution of the pre-stored start-up instructions, is arranged to:
   receive a further instruction, from the look-up server, with an updated value of a property; and
   store the updated value of the property.

17. The method as claimed in claim 10, wherein the user unit, following the execution of the pre-stored start-up instructions, is arranged to:
   receive further instructions, from the look-up server, based on which the set of pre-stored start-up instructions are altered or a new set of start-up instructions is defined.

18. The method as claimed in claim 10, wherein the pre-stored start-up instructions are executed by the user unit when the user unit initiates a session for sending information read from a surface, which session is initiated when the user unit detects reading of information from a specific send area of the surface.

19. The method as claimed in claim 18, wherein said send area is pre-determined to be associated with an address parameter defining a remote look-up server, wherein the receiving an instruction with control data includes receiving an instruction with control data that are based on information management rules stored by the remote look-up server.

20. The method as claimed in claim 18, wherein said send area is pre-determined to be associated with an address parameter defining a local look-up server, wherein receiving an instruction with control data includes receiving an instruction with control data that are based on information management rules stored by the local look-up server.

21. The method as claimed in claim 1, wherein any user unit message transmitted from the user unit includes a unique identity of the user unit.

22. The method as claimed in claim 1, wherein information read from a surface includes at least one position of a position coded surface.

23. A user unit arranged to manage communication in a system, the user unit being capable of reading information from a surface and communicating at least part thereof to a server in the system, the system including a look-up server which stores information management rules associated with information read from the surface and at least on application server, the user unit being further arranged to:
   receive, from the look-up server, at least one instruction with control data which control what information that is allowed to be communicated by the user unit; and
   determine, based on the instruction received from the look-up server, when receiving an instruction from an application server to respond with specific information data, if the specific information data is allowed to be communicated, and, if so, transmitting the specific information data in a user unit message to a receiving application server.

24. A computer-readable medium storing computer-executable components for causing a user unit, which is capable of reading information from a surface and communicating at least part thereof to a server, to perform steps when the computer-executable components are run on a microprocessor included by the user unit, the steps comprising:
   receiving, at the user unit from a look-up server, at least one instruction with control data which control what information that is allowed to be communicated by the user unit; and
   determining, at the user unit and based on the instruction from the look-up server, when receiving an instruction from an application server to respond with specific information data, if the specific information data is allowed to be communicated, and, if so, transmitting the specific information data in a user unit message to a receiving application server.

* * * * *